US006199254B1

(12) United States Patent
Suresh

(10) Patent No.: US 6,199,254 B1
(45) Date of Patent: Mar. 13, 2001

(54) SWAGING TOOL WITH MULTIPLE PUSHERS

(75) Inventor: Srinivas B. Suresh, Irvine, CA (US)

(73) Assignee: Mechl LLC, San Francisco, CA (US)

(*) Notice: Subject to any disclaimer, the term of this patent is extended or adjusted under 35 U.S.C. 154(b) by 0 days.

(21) Appl. No.: 09/434,632

(22) Filed: Nov. 5, 1999

(51) Int. Cl.[7] ............................ B23P 19/04; B21D 39/04

(52) U.S. Cl. ............................ 29/237; 29/252; 29/283.5

(58) Field of Search ............................ 29/237, 244, 252, 29/283.5

(56) References Cited

U.S. PATENT DOCUMENTS

| | | | |
|---|---|---|---|
| 539,573 | 5/1895 | Cartwright . | |
| 1,085,461 | 1/1914 | Michaelis . | |
| 1,350,904 | 8/1920 | Walters . | |
| 2,328,747 | 9/1943 | Schweidler | 7/14.1 |
| 3,143,790 | 8/1964 | Over et al. | 29/203 |
| 3,280,864 | 10/1966 | Spanenberg | 144/193 |
| 3,579,794 | 5/1971 | Powell | 29/237 |
| 3,726,122 * | 4/1973 | Dawson | 29/237 |
| 4,019,232 * | 4/1977 | Hattori | 29/283.5 |
| 4,189,817 | 2/1980 | Moebius | 29/237 |
| 4,345,361 | 8/1982 | Baumann | 29/237 |
| 4,483,056 | 11/1984 | Schwalm et al. | 29/237 |
| 4,809,418 | 3/1989 | Burli | 29/237 |
| 4,956,904 * | 9/1990 | Yamamoto | 29/237 |
| 5,271,257 * | 12/1993 | Irwin | 29/237 |
| 5,297,325 | 3/1994 | Thelen | 29/237 |
| 5,305,510 | 4/1994 | Croft et al. | 29/237 |
| 5,398,394 | 3/1995 | Hyatt et al. . | |
| 5,592,726 | 1/1997 | Suresh | 29/237 |

OTHER PUBLICATIONS

Bierstaker, M. et al., "Qualification of Non–Standard Piping Product Form for ASME Code for Pressure Piping, B31 Applications", ASME pp. 127–134, Reprinted from PVP, vol. 210–1, Codes & Standards & Applns. f/Design & Analysis of Pressure Vessel & Piping Components. Book. No. H00636–1991.

Markl, A.R.C., "Fatigue Tests of Piping Components", pp. 1148–1164, Reprinted from Transactions ASME, 1952.

* cited by examiner

*Primary Examiner*—Daniel C. Crane
(74) *Attorney, Agent, or Firm*—Skjerven Morrill MacPherson LLP; Theodore P. Lopez

(57) ABSTRACT

A swaging tool for use in swaging axially swaged fittings for joining together pipes. The present invention provides a radially balanced axial force, for uniformly pushing a ring of an axially swaged fitting over a sleeve, to swage the fitting to the pipe. The swaging tool of the present invention includes a tubular housing, having an inner surface, which defines a bore. The bore is configured to receive a pipe section having an axially swaged fitting placed thereon in preparation for swaging. Preferably, the housing may be split lengthwise into two opposed sections, such that when the two sections are brought together, the sections completely surround a portion of the pipe section and the fitting. Each housing section is provided a plurality of pusher assemblies, each pusher assembly may preferably be connected to a source of hydraulic pressure, which when activated moves the pusher assembly axially to provide the axial force necessary for swaging the fitting. Each pusher assembly is made to uniformly contact the ring with a substantially equal amount of force, such that the ring is moved axially over the sleeve, which causes a radial force to be applied to the sleeve to swage the sleeve to the pipe section.

20 Claims, 10 Drawing Sheets

SWAGING TOOL WITH MULTIPLE PUSHERS

BACKGROUND OF THE INVENTION

1. Field of the Invention

This invention relates to swaging tools for use with swage fittings, and more particular to a swaging tool for swaging axially swaged fittings.

2. Description of the Related Art

Fittings of various types are commonly used to couple tubes and pipes for a variety of applications. For example, in the aerospace industry, swage fittings couple hydraulic lines, fuel lines, and the like used to convey fluids in aircraft and other vehicles. Swage fittings also couple pipes, tubes, and conduits (hereinafter collectively “pipes”) that transport fluids in the marine, petroleum, and chemical industries. The coupling generally involves inserting pipe ends into a cylindrical sleeve of the fitting, and then swaging the fitting to the pipe using a swaging tool, to provide a fluid-tight or hermetic seal between the pipes. The swaging operation, generally requires the application of a radial force that deforms a portion of the pipe and the sleeve. The radial force may be applied directly to the fitting by the swaging tool, or indirectly through a swaging ring, which is moved axially over the fitting by the swaging tool to apply a radial force to the sleeve. Of interest in the present invention are the latter fittings, known as axially swaged fittings. The swage methodology is well known and is described in numerous patents, for example, U.S. Pat. Nos. 3,675,949 and 3,893,718.

Swaging tools are well known and their usefulness is well understood. Two examples of swaging tools for axially swaged fittings are described, for example in U.S. Pat. Nos. 5,398,394, and 5,592,726. Generally, the tools described in these patents have a first and second engagement members, which cradle the ring and/or the sleeve of the fitting while axially moving one engagement member towards the other to swage the fitting. The engagement members are U-shaped members that contact only a portion of the fitting. Thus, the swaging tool tends to provide the majority of axial force along the contacted portion of the pipe, which tends to create a non-uniform force distribution over the ring. The non-uniform force distribution may cause the pipe to cock or deflect as the ring is moved over the sleeve. This may cause gaps in the joint. The effect of a gap in small bore pipe swaging applications, is typically negligible. However, the inability of the tools to provide a substantially uniform axial force over the non-cradled portion of a pipe becomes problematic in large diameter bore pipes. As a result, swaging techniques are not widely used in industrial applications requiring large diameter bore pipes, especially for pipes containing high pressure fluid flow, such as in the marine and offshore oil and gas industries.

Until now, improvements in swaging tools for large diameter bore, high pressure pipe applications have generally been seen as unnecessary since large bore pipes may be coupled together using welds, flange and bolt connections, and threaded engagements. Although these types of connections are commonplace, they have a variety of drawbacks, which make them high cost, high risk, and/or time consuming alternatives to the present invention. For example, welded pipe joints usually require additional pre- and post-weld preparations that are often expensive and time consuming, such as pipe end preparation, post weld grinding, non destructive inspection, and hydro-testing. Welded pipes have also been known to fail at weak spots in heat affected areas adjacent to the welds. Moreover, welding in the vicinity of potentially flammable fluids, such as fuel and oil, which may be used in the pipes or tubes, is inherently risky. Flanged and bolted connecting systems require that the pipe ends be flared prior to use which may be inconvenient, expensive, and time consuming. To create the joint, the flanges are bolted together with a gasket in between, to provide a seal. In many instances vibrations or other general usage may loosen bolts and cause leaks. Moreover, gaskets are prone to failure after time or are easily damaged, which is another source of leaks. Threaded systems require pipe ends to be threaded, which can be both time consuming and ineffective. Generally, an abundance of access space is necessary for using wrenches and the like to couple the threaded pipes. Typically, a sealant is used on the threads to fill gaps and prevent leaking. However, after a period of time, the sealant can deteriorate, which leads to leaking.

For the above reasons, a swaging tool is needed that can swage axially swaged fittings on large bore pipes, such as those used in high pressure applications.

SUMMARY OF INVENTION

The present invention provides a swaging tool for swaging axially swaged fittings on pipes, especially pipes of two inches or more in diameter. The present invention, as described in more detail below, provides a radially balanced axial force, for uniformly pushing a ring of a fitting over a sleeve of the fitting, to swage the fitting to a pipe. The swaging tool is designed to be light weight and small in size, but able to provide an efficient swaging force. Further, the swaging tool is compact, simple to use, low maintenance, and relatively inexpensive to manufacture.

A swaging tool in accordance with one embodiment of the present invention includes a tubular housing, having an inner surface, which defines a bore. The bore is configured to receive at least one pipe section having an axially swaged fitting placed thereon in preparation for swaging. Preferably, the housing may be split lengthwise into two opposed sections, such that when the two sections are brought together, the sections completely surround a portion of the pipe sections and the fitting. Each housing section has cylindrical holes, typically formed symmetrically and circumferentially on one end of each section. The cylindrical holes are each configured to hold a pusher assembly. The pusher assembly preferably includes a pusher connected to a source of hydraulic pressure, which when activated moves the pusher axially to provide the axial force necessary for swaging the fitting. The pushers are made to uniformly contact the ring with a substantially even force that moves the ring axially over the sleeve. The axial movement causes the ring to apply a radial force to the sleeve to swage the sleeve to the pipe section. When the swaging operation is complete, the hydraulic pressure is removed from the pusher. A spring or other biasing device within the housing retracts the pusher into the cylindrical holes.

In one aspect of the invention, a swaging tool includes a housing having an inner surface, a first end, a second end, and a bore therebetween. The bore is configured to receive a portion of a pipe. A plurality of pusher assemblies are disposed uniformly and circumferentially around the housing, typically in axial alignment with the bore. When the pusher assemblies are brought into contact with the fitting, the pusher assemblies provide an evenly distributed axial force to the ring.

In another aspect of the invention, a swaging tool includes a housing having a first housing section and a second housing section, an inner surface, a first end, a second end, and a bore therebetween. The bore is configured to receive a portion of a pipe for swaging. A plurality of pusher assemblies are disposed uniformly and circumferentially around the bore in the housing. Each housing section includes an equal number of the pusher assemblies, such that when the pusher assemblies are brought into contact with the fitting, the pusher assemblies provide an evenly distributed axial swaging force to the fitting.

In another aspect of the present invention, a system for providing a swaging force includes a fitting, which has a sleeve and a swaging ring. Advantageously, the sleeve includes a deformable stepped portion. Also provided are a plurality of pusher assemblies disposed circumferentially in a housing to provide an evenly distributed force to axially move the swaging ring over the sleeve and thereby deform the stepped portion.

The two housing section of the swaging tool, in conjunction with many other features described below, makes handling of the tool convenient. Also, the tool may be custom sized for a particular size pipe, making unlikely the use of the wrong pipe or fitting with the wrong swaging tool. The system being a non-weld solution for use in a variety of industrial applications, is suitable where hot work, like welding or brazing, is not recommended for safety reasons. The present invention has a lower relative cost than other pipe fastening methods, since no pre- or post-swaging operations, such as X-ray inspection, post-weld cleaning, and/or pipe flushing are required. Further cost savings may be achieved as a result of avoiding a number of labor intensive pre-swaging pipe end preparation operations, such as grooving, bevel grinding, and/or flaring.

These and other features and advantages of the present invention will be more readily apparent from the detailed description of the embodiments set forth below taken in conjunction with the accompanying drawings.

DETAILED DESCRIPTION OF SPECIFIC EMBODIMENTS

Embodiments of the present invention will be described with reference to the aforementioned figures. These figures have been simplified for ease of understanding and describing the embodiments.

Figure 1A:
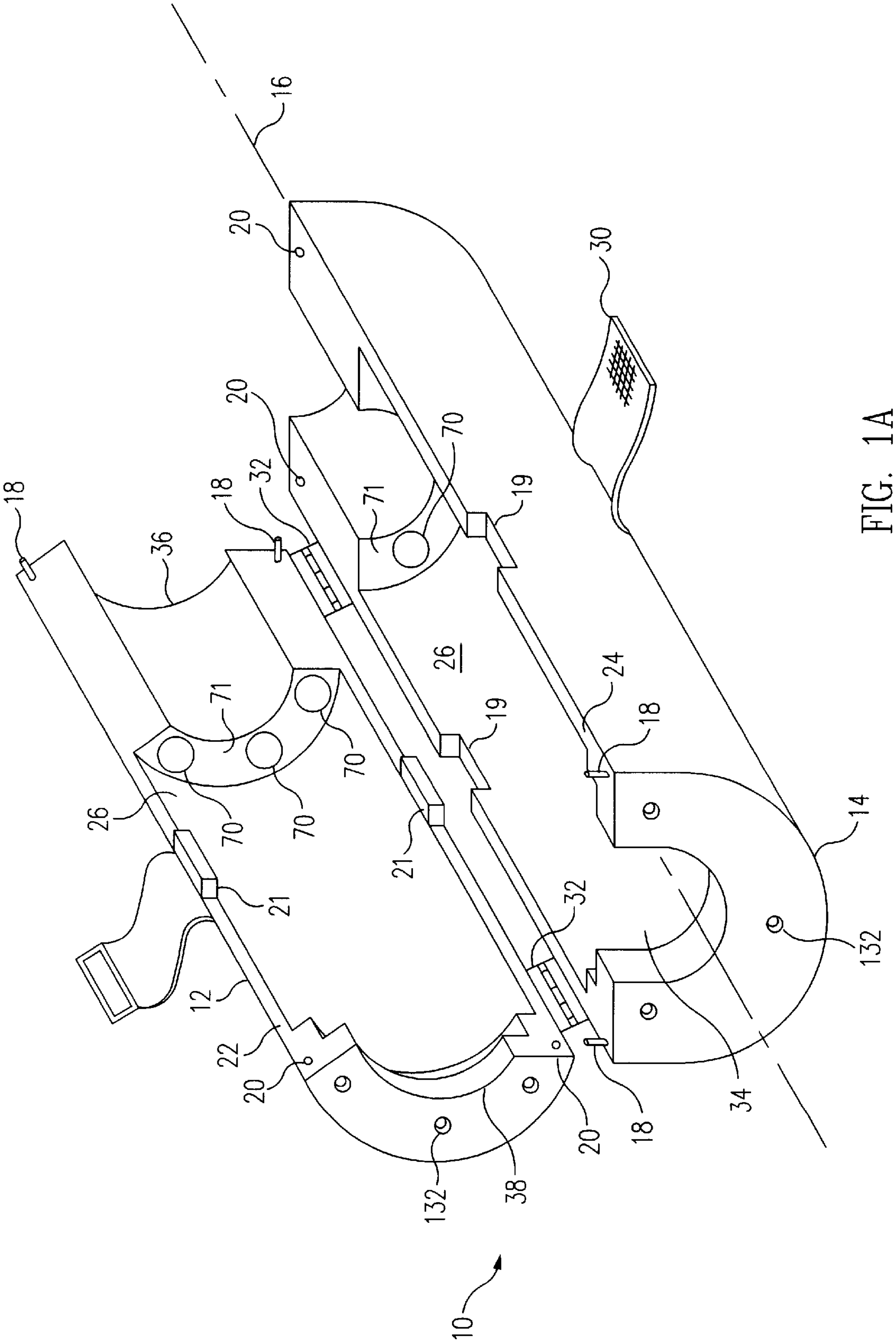
FIGS. 1A and 1B are simplified illustrations of an open perspective view and a substantially closed side view, respectively, of a swaging tool embodying features of the present invention.
Figure 1B:
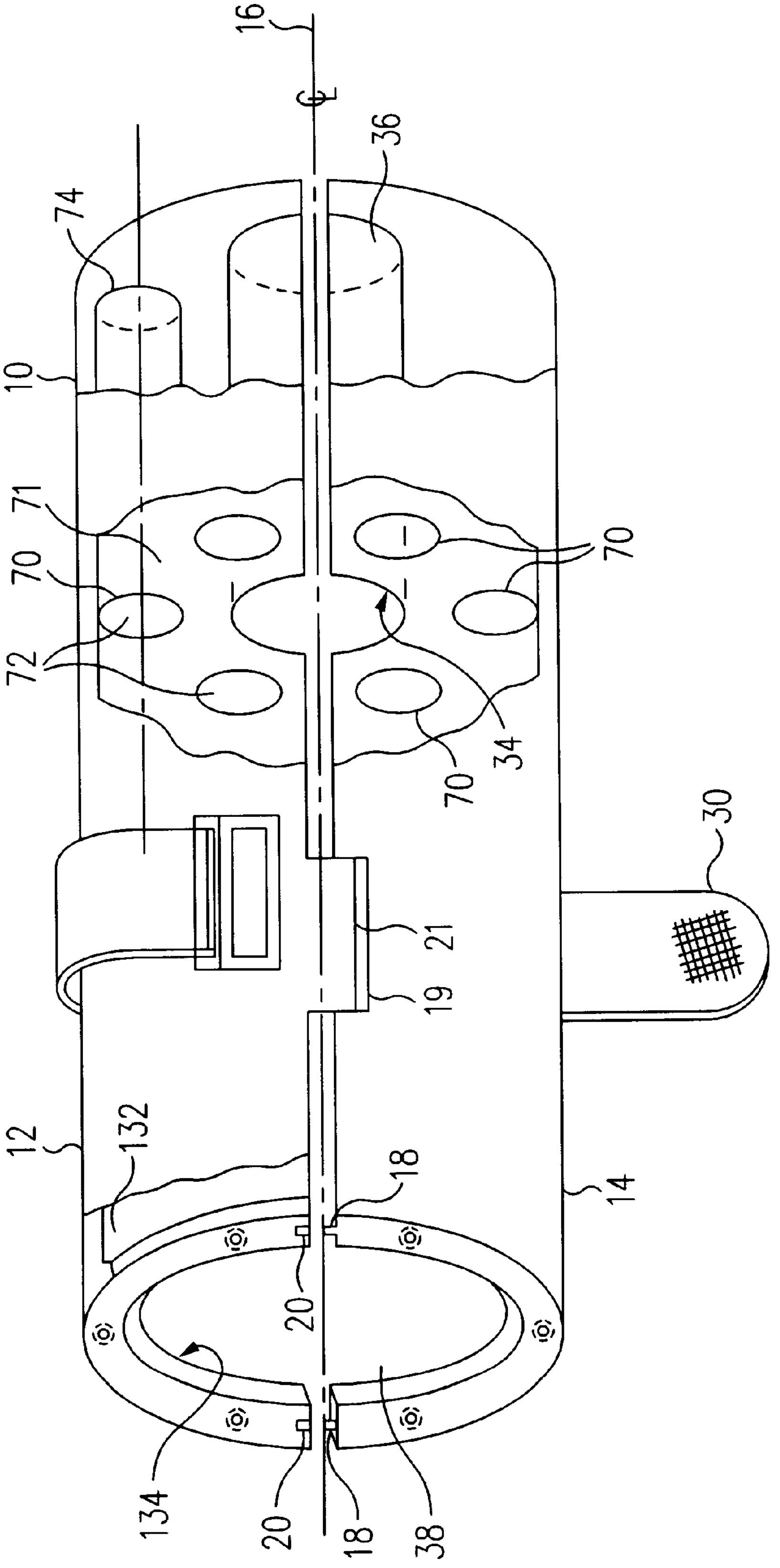
Figure 1C:
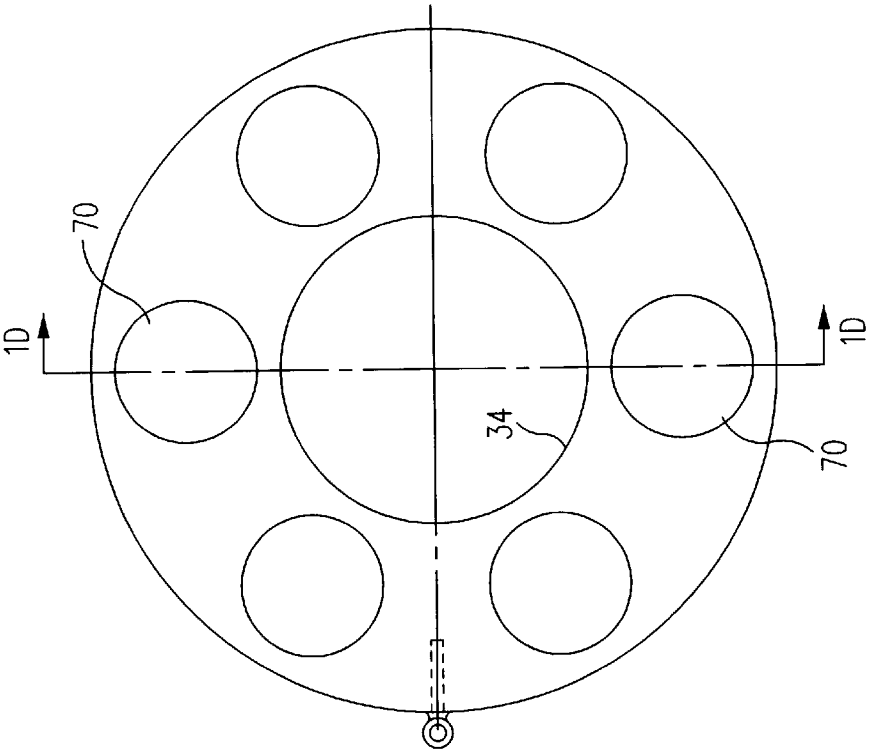
FIG. 1C is a simplified rear view of an embodiment of the tool of FIGS. 1A and 1B.

FIGS. 1A and 1B show an open perspective view and a substantially closed side view, respectively, of a swaging tool in accordance with an embodiment of the present invention. Swaging tool 10 includes a first housing section 12 and a second housing section 14. Swaging tool 10 is broadly symmetrical about a central axis 16. Thus, the description of swaging tool 10 is directed to only one housing section of the tool, with reference to the other housing section, only when necessary to describe a feature of the invention, since the other section is structurally and functionally the same. Each housing section 12 and 14, as well as many of the features included in the housing, as described below, may be formed using conventional machining and milling techniques, for example electrical discharge machining (EDM).

Housing sections 12 and 14, when assembled together, form the complete swage tool 10. Aligning features in housing sections 12 and 14 ensure proper positioning and alignment of the sections and resist relative movement of sections 12 and 14 during swaging. In one embodiment, the aligning features include a pin and hole arrangement. For example, at least two pins 18 may be opposite corresponding holes 20 and positioned at opposite ends of housing sections 12 and 14 on rims 22 or 24. The aligning features may also include cut-outs 19 and inserts 21 to prevent relative axial movement of housing sections 12 and 14. For example, at least two cut-outs 19 may be disposed on rim 24 on opposite sides of housing section 14. Correspondingly, inserts 21 may be opposite cut-outs 19 on rim 22 of housing section 12. In this embodiment, bringing housing sections 12 and 14 together inserts pins 18 into holes 20 and inserts 21 into cut-outs 19.

After mating the aligning features together, housing sections 12 and 14 may be removably secured together, such that the housing sections may not inadvertently or otherwise disengage from one another. A fastening mechanism 30 is on tool 10 to fasten and securing the housing sections 12 and 14 together as one unit. In one embodiment, the fastening mechanism includes a strap 30 attached to both housing sections 12 and 14, such that the strap can be wrapped around the housing sections and joined together, for example, with a buckling device or a VELCRO fastener. When tool 10 is to be removed from a pipe joint, strap 30 is disconnected, and the two housing sections are separated. Alternatively, any conventional fastening mechanism suitable for holding housing sections 12 and 14 together, such as a latch, a buckle, a clamp, and the like can replace strap 30. The number of fastening mechanisms is determined according to the size of the pipe sections being swaged and the amount of force required to hold the sections together.

Optionally, at least one hinge mechanism 32, preferably two couples housing sections 12 and 14 of swaging tool 10 together. Hinge mechanism 32 may be a conventional hinge, which allows housing sections 12 and 14 to swing apart from one another, while remaining coupled together, to facilitate installation and removal of the pipe section.

Figure 1D:
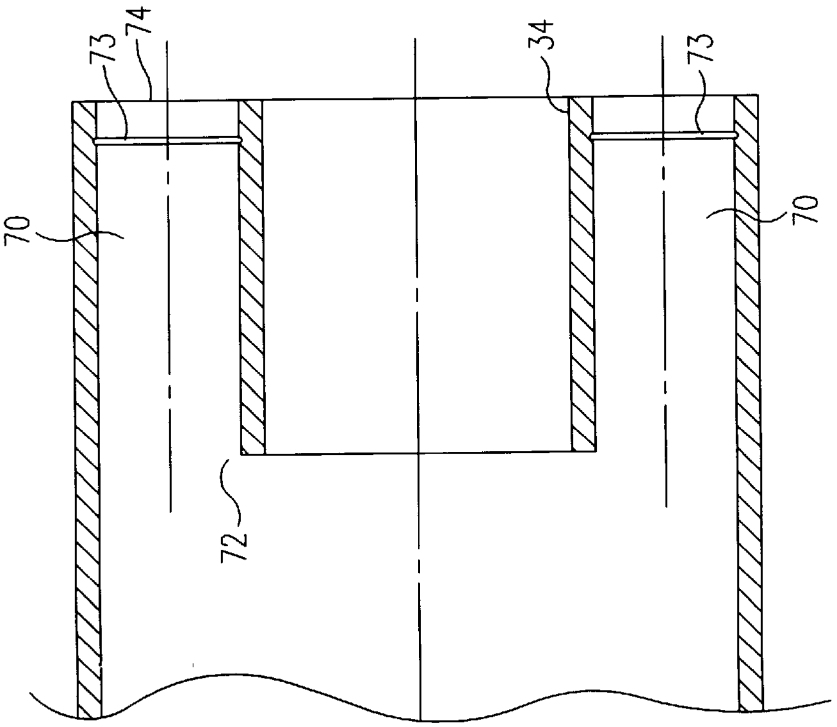
FIG. 1D is a simplified sectional view of an embodiment of the tool of FIG. 1C.

In a preferred embodiment, as shown in FIGS. 1B and 1D, when swaging tool 10 is assembled, housing sections 12 and 14 define a substantially cylindrical inner bore 34. Bore 34 is configured to slidably receive a pipe section (not shown). Bore 34 may be sized to fit any diameter pipe section, however, in a preferred embodiment, bore 34 may be configured to receive a large bore pipe section, such as a pipe with an external diameter of 2 in. or larger. Tool 10 may be used with any conventional pipe section, made of any conventional piping material, such as steel, copper, titanium, and the like. The pipe section may be of any wall thickness, for example between about SCH 5 and SCH 80.

Figure 2:
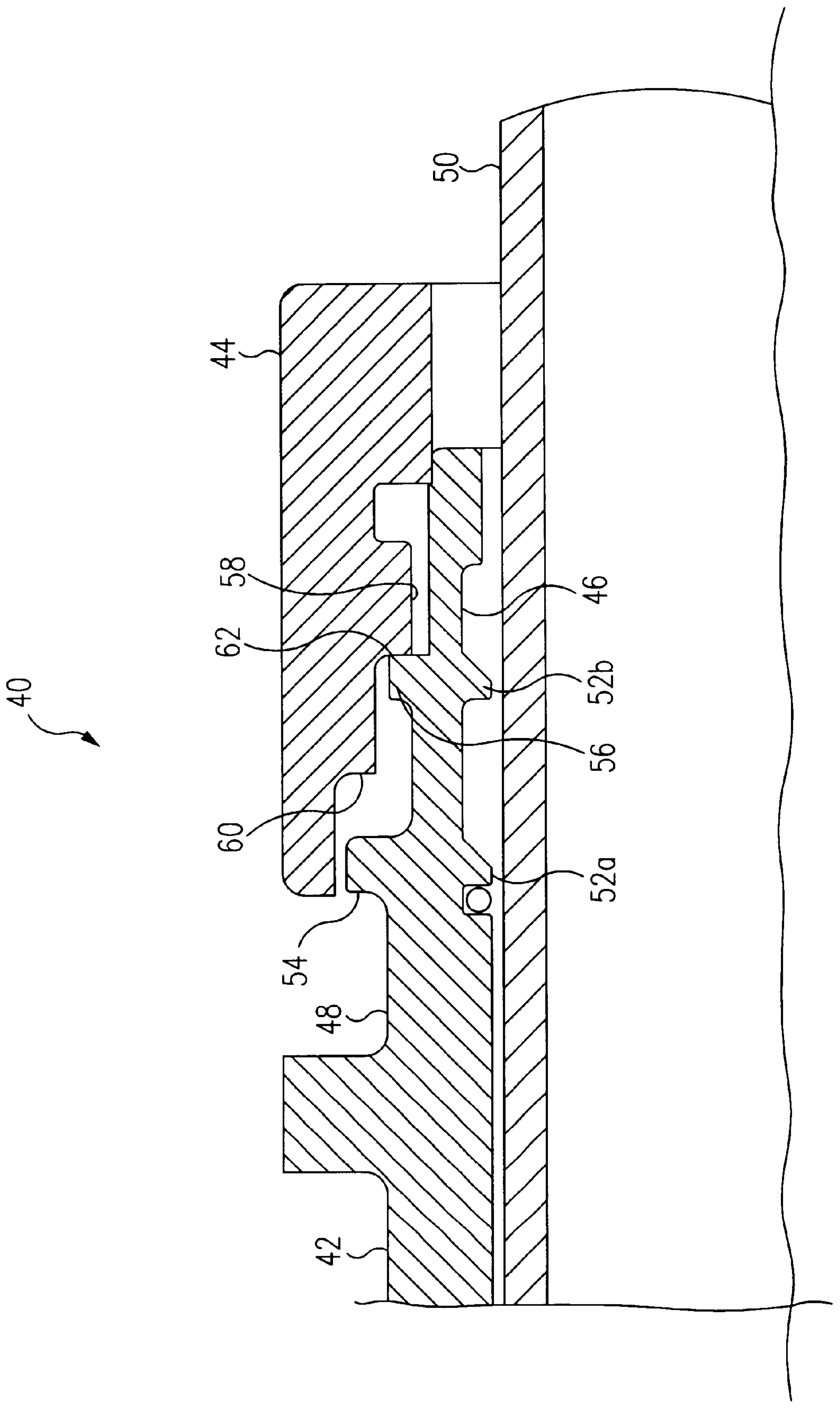
FIG. 2 is a simplified illustration of an exemplary fitting for use in an embodiment of the present invention.

The pipe section placed into swaging tool 10 may have a swage fitting thereon. Swaging tool 10 is especially adapted for swaging axially swaged fittings, which provide a reliable, hermetically sealed pipe joint. The fitting typically includes a sleeve and a ring. When the ring is moved axially over the sleeve, the ring applies a radial force to the sleeve which swages the sleeve to the pipe. As appropriate, tool 10 may be used with axially swaged fittings including one ring, two rings, or any other configuration and combination. One such exemplary fitting, shown in FIG. 2, is fully described in co-filed U.S. patent application Ser. No. 09/434,626, filed Nov. 5, 1999, which is incorporated herein by reference for all purposes.

Referring to FIG. 2, fitting 40, shown in a pre-swaged configuration, creates a high strength connection that prevents attached pipe sections from pulling out of the fitting. Fitting 40 includes sleeve 42 and ring 44. Sleeve 42 has an inner sleeve surface 46 and an outer sleeve surface 48. In one embodiment, protrusion rings 52*a* and 52*b* are provided, which are sufficiently shaped and sized to provide a gripping action when made to contact and/or deform the outer surface of pipe section 50. Fitting 40 also includes a plurality of stepped portions, for example, first stepped portion 56 and second stepped portion 54 disposed on outer sleeve surface 48. Ring 44 has a cylindrical outer body, which has an inner surface 58 configured to engage outer sleeve surface 48 and apply a force that deforms the sleeve. To create the deformation, inner ring surface 58 has a first contact portion 62 and a second contact portion 60, each configured to engage first stepped portion 56 and second stepped portion 54, respectively, with an interference fit. The axial swaging force from swaging tool 10 applied to ring 44 causes the ring to overcome the interference and deform the stepped portions. In a preferred embodiment, first contact portion 62 engages with first stepped portion 56 prior to second contact portion 60 contacting second stepped portion 54. This advantageously reduces the swaging force that ring 44 must apply to sleeve 42.

Referring to FIGS. 1A–1D, housing sections 12 and 14 each include a plurality of cylindrical holes 70, formed axially in a flanged portion 71 of each housing section 12 and 14. The cylindrical holes 70 each have a first end 72, which commences at approximately the center of the housing section, and a second end 74, which is the terminal end of hole 70 at the rear end 36 of tool 10. As best understood from the exemplary embodiment of FIGS. 1C and 1D, each hole 70 is formed within flange portion 71 axially aligned with bore 34. Holes 70 are proximate to, and symmetrically located around a circumference of bore 34. Each hole 70 has a smooth inner surface, with a snap ring groove 73 formed proximate to end 74. The number of cylindrical holes required in tool 10 may vary depending on the size of the pipe being swaged and the force required for swaging. However, for symmetry, each housing section 12 and 14 should have an equal number of holes 70. In one example, with no intention to limit the invention thereby, each housing section includes three cylindrical holes disposed at 60° intervals. In yet another example, each housing section includes four cylindrical holes disposed at 45° intervals. In a preferred embodiment, cylindrical holes 70 serve as individual housings for pusher assemblies 76 and retainer assemblies 86, as described in greater detail below.

Figure 3:
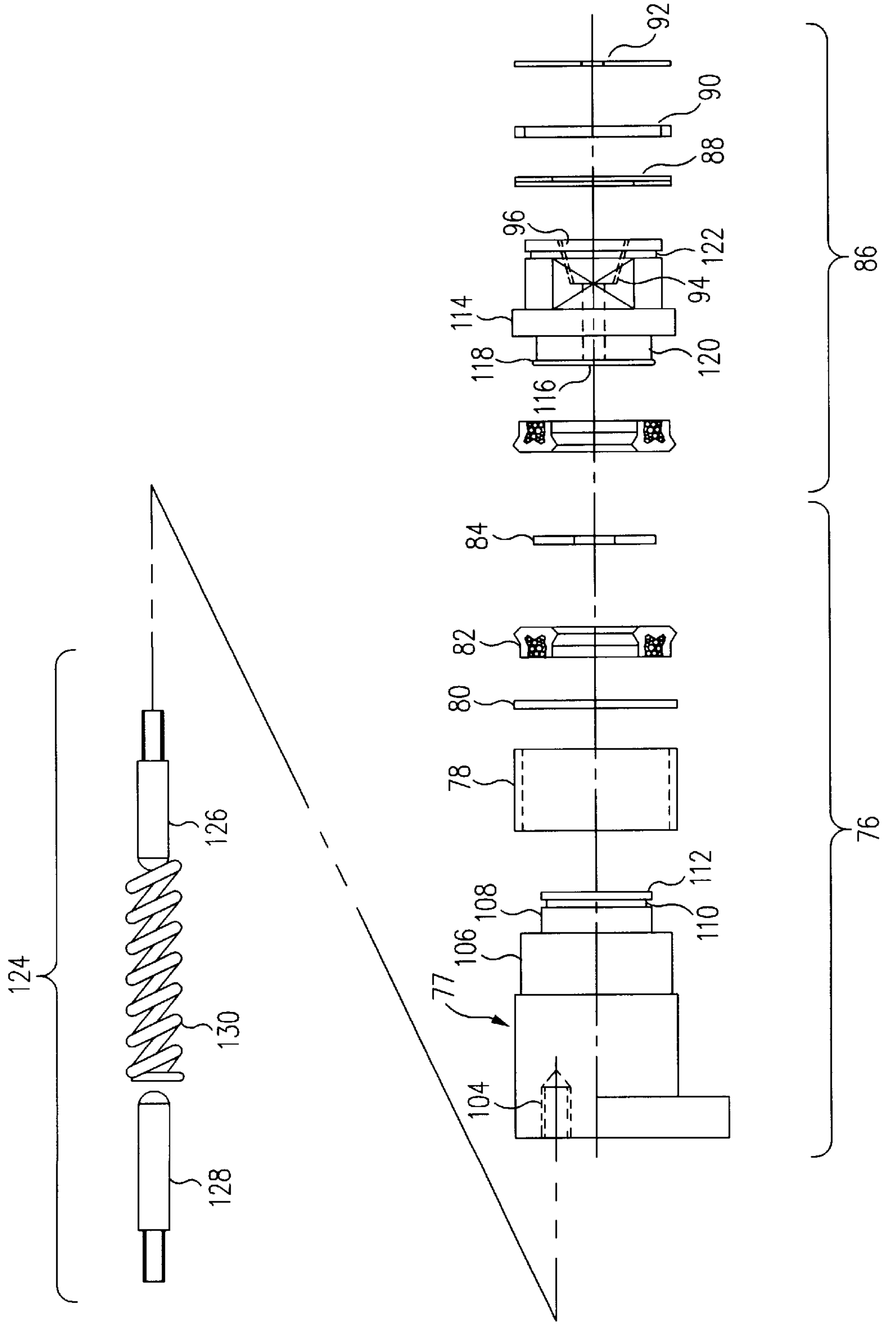
FIG. 3 is a simplified illustration of an exploded assembly view of components of a tool in accordance with an embodiment of the present invention.

Referring now to the exploded assembly view of FIG. 3, a pusher assembly 76 includes a pusher 77, a bearing 78, a washer 80, an oil seal 82, and a snap ring 84. In general, pusher 77 may be formed using conventional milling and metal-removal techniques, which are well known in the art. On a first end of pusher 77 is a pusher face 100, which forms the point of contact between pusher assembly 76 and the swaging ring, during the swaging operation.

Figure 4:
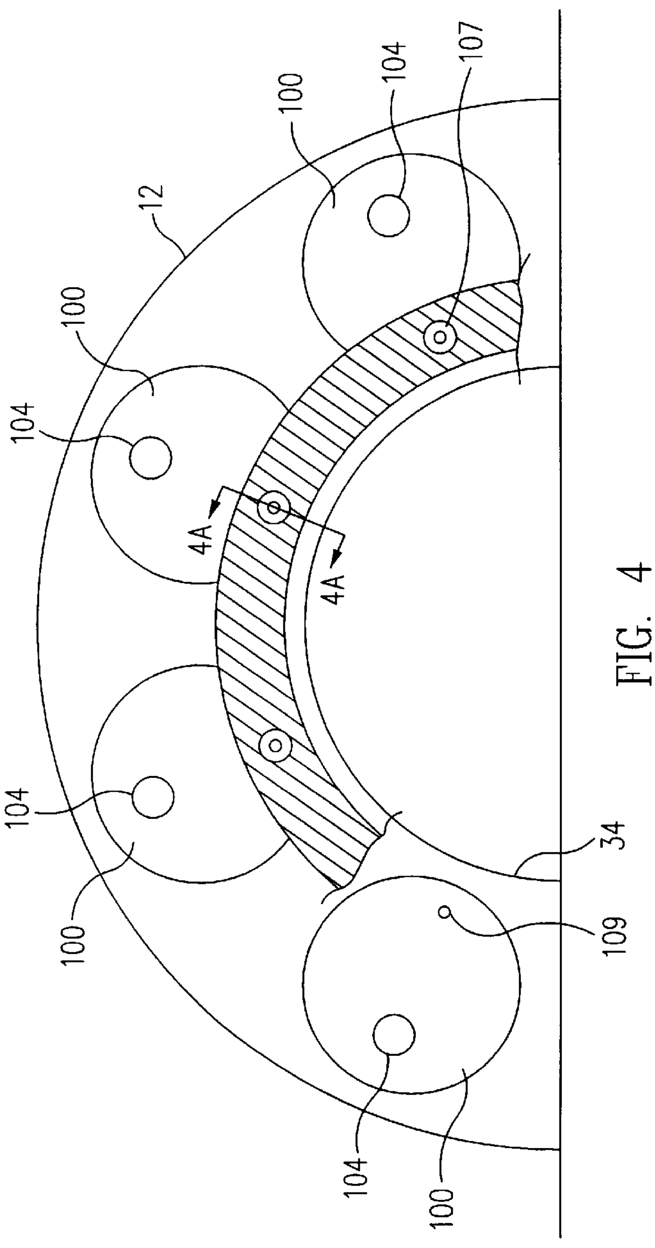
FIG. 4 is a simplified view of an embodiment of the present invention.
Figure 4A:
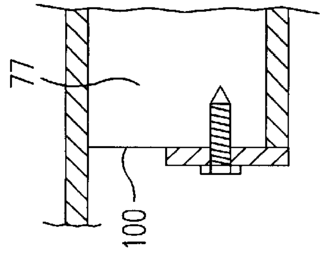
FIG. 4A is a simplified cross-sectional view of the embodiment of FIG. 4.

In one embodiment of the present invention, as shown in FIGS. 4 and 4A, pusher face 100 may be a substantially circular member. Since pusher face 100 has a conventional, substantially circular form, pusher 77 may be easier to manufacture. Included on the face of pusher face 100 may be pusher tap hole 104 or a cavity 131, and assembly hole 109, both described in greater detail below. In this embodiment, a continuous semi-circular ring 107 is mounted at assembly hole 109, to each pusher face 100 disposed in the housing section. A screw or other conventional fastening means attaches semi-circular ring 107 to pusher faces 100. As mounted, semi-circular ring 107 provides the contact between each pusher assembly 76 and the swaging ring. Using semi-circular ring 107 to contact the swaging ring, increases the surface contact area between pushers 77 and the swaging ring so as to more evenly distribute the axial swaging force on the swaging ring. The outer diameter of semi-circular ring 107 may be sized so that semi-circular ring 107 cannot interfere with the use of pusher tap hole 104. The inner diameter of semi-circular ring 107 is large enough so as to not interfere with the pipe section placed within bore 34. Coupling each pusher assembly 76 to semi-circular ring 107 prevents pusher assemblies 76 from inadvertently rotating within holes 70. Semi-circular ring 107 may be made using conventional manufacturing techniques, such as machining, milling or molding techniques. Semi-circular ring 107 may be made of any suitable material capable of withstanding the contact force developed by pusher assemblies 76. For example, Semi-circular ring 107 may be made of steel, aluminum or copper-nickel, or of a hardened plastic.

Figure 5:
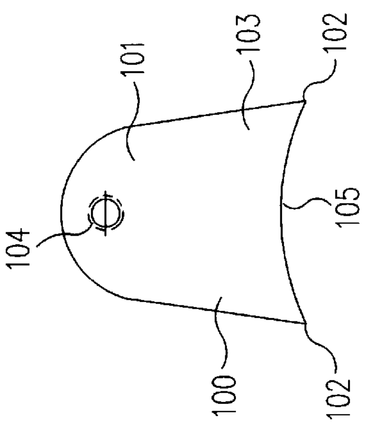
FIG. 5 is a simplified illustrations of an embodiment of the present invention.

FIG. 5 shows an alternative embodiment of pusher face 100. In this embodiment, each pusher face 100 has a semi-circular top portion 101 and a flared elongated bottom portion 103. Flared bottom portion 103 provides the contact area between pusher assembly 76 and the swaging ring. Bottom portion 103 has a curved center portion 105. The curvature of center portion 105 depends on the pipe diameter, such that the curvature conforms with the circumference of the pipe, to permit pusher assembly 76 to ride over a portion of the pipe surface during swaging. The curved center area forms pusher forks 102, which capture a portion of the pipe to be swaged in-between the forks, without actually contacting the pipe. In this manner, forks 102 keep pusher face 100 in alignment with the pipe to keep pusher assembly 76 from inadvertently rotating within hole 70.

On the end of pusher assembly 76, opposite pusher face 100, is a bearing step 106, an oil seal step 108, a snap ring groove 110, and a pusher shoulder 112. To assemble pusher assembly 76, bearing 78 is positioned on bearing step 106, and oil seal 82 is positioned on oil seal step 108. Pusher assembly 76 is then inserted into first end 72 of hole 70 with a sliding fit. Snap ring 84 is inserted into groove 110 to hold the components of pusher assembly 76 in place.

Also shown in the assembly view of FIG. 3 is stationary retainer assembly 86. Retainer assembly 86 includes a retainer body 114, which in some embodiments may have a hollow lumen 116 (shown in phantom) extending therethrough, the purpose of which will be described below. Retainer assembly 86 also includes a retainer shoulder 118, an oil seal groove 120, and a retainer snap ring groove 122. The components of retainer assembly 86 are assembled and then inserted into second end 74 of cylindrical hole 70. Retainer assembly 86 is retained in place using an internal snap ring 88, which expands into groove 73 of hole 70. An external snap ring 92 is used at second end 74, outside of hole 70. Snap rings 88 and 92 are used to prevent axial motion of the retainer assembly 86 during swaging.

Biasing assembly 124 returns pusher assembly 76 into cylindrical hole 70 once the hydraulic pressure is removed from tool 10, and the swaging operation is completed. Biasing assembly 124, may include any arrangement that provides a bias force to return pusher assembly 76 into its pre-swage position within hole 70. In one embodiment, biasing assembly 124 includes pusher guide pin 126, housing guide pin 128, and spring 130. Pusher guide pin 126 fits into pusher tap hole 104. Guide pin 126 may be held into tap hole 104 using an interference fit or, alternatively, guide pin may be screwed into tap hole 104. Housing guide pin 128 fits into a housing tap hole 132, on an inner portion of the housing section (See FIG. 1B). Housing guide pin 128 may be inserted into housing tap hole 132 using an interference fit or, alternatively, guide pin 128 may be screwed into housing tap hole 132. Pusher guide pin 126 and housing guide pin 128 are axially aligned, such that when spring 130 is inserted over guide pins 126 and 128, the pins keep the spring in axial alignment, which keeps spring 130 from buckling when compressed. In yet another embodiment of biasing assembly 124, spring 130 may be inserted directly into a cavity 131 formed on pusher face 100. Cavity 131 has a diameter large enough to accommodate spring 130. The depth of cavity 131 is made deep enough to capture a significant portion of spring 130, such that the spring does not buckle when compressed. Spring 130 may be any type of spring, but preferably is a compression coil spring.

Figure 6A:
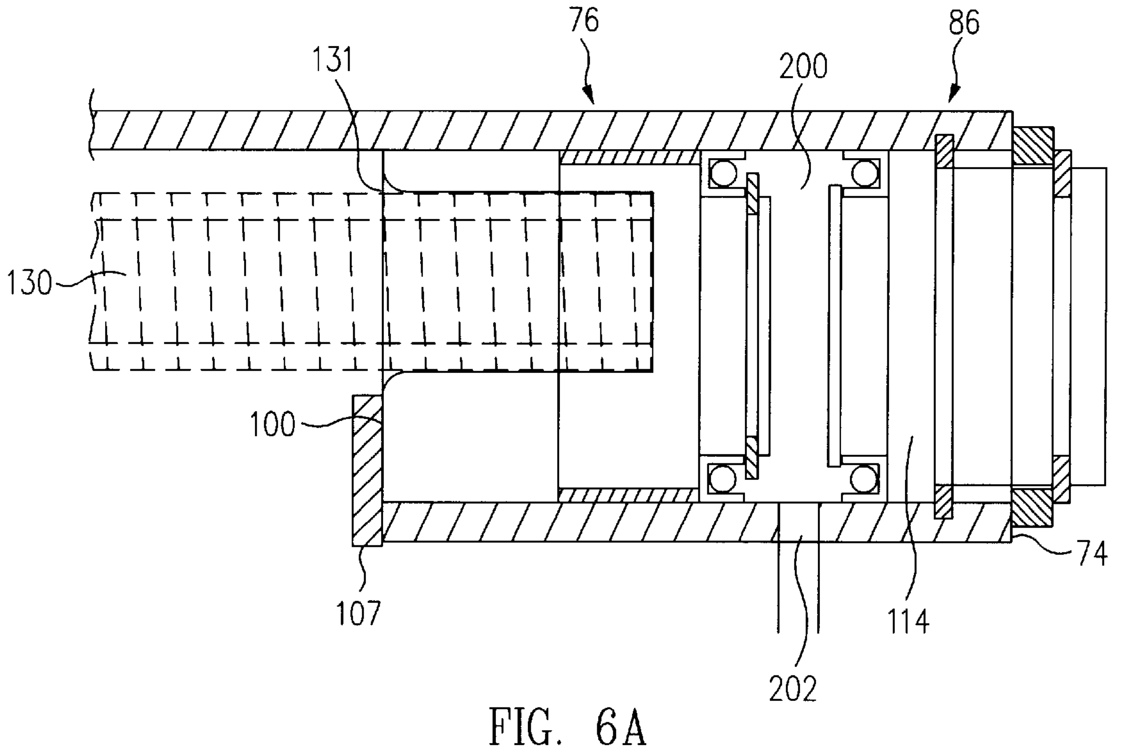
FIG. 6A is a partial cross-sectional view of the pusher assembly and the retainer assembly inserted into a cylindrical hole and defining a reservoir in accordance with an embodiment of the present invention.
Figure 6B:
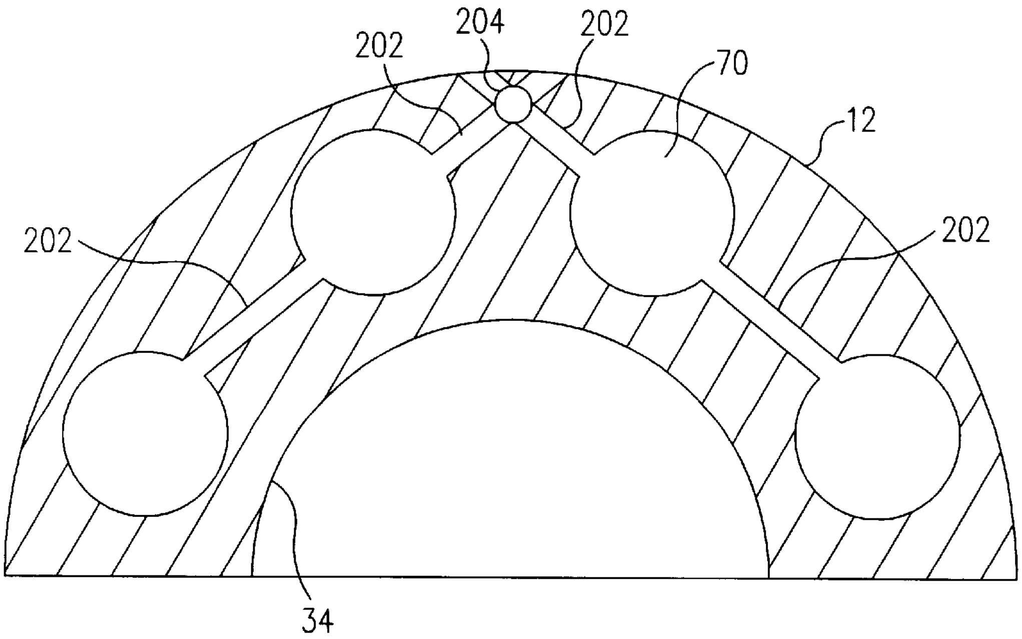
FIG. 6B is a simplified illustration of the duct network in accordance with one embodiment of the present invention.
Figure 7:
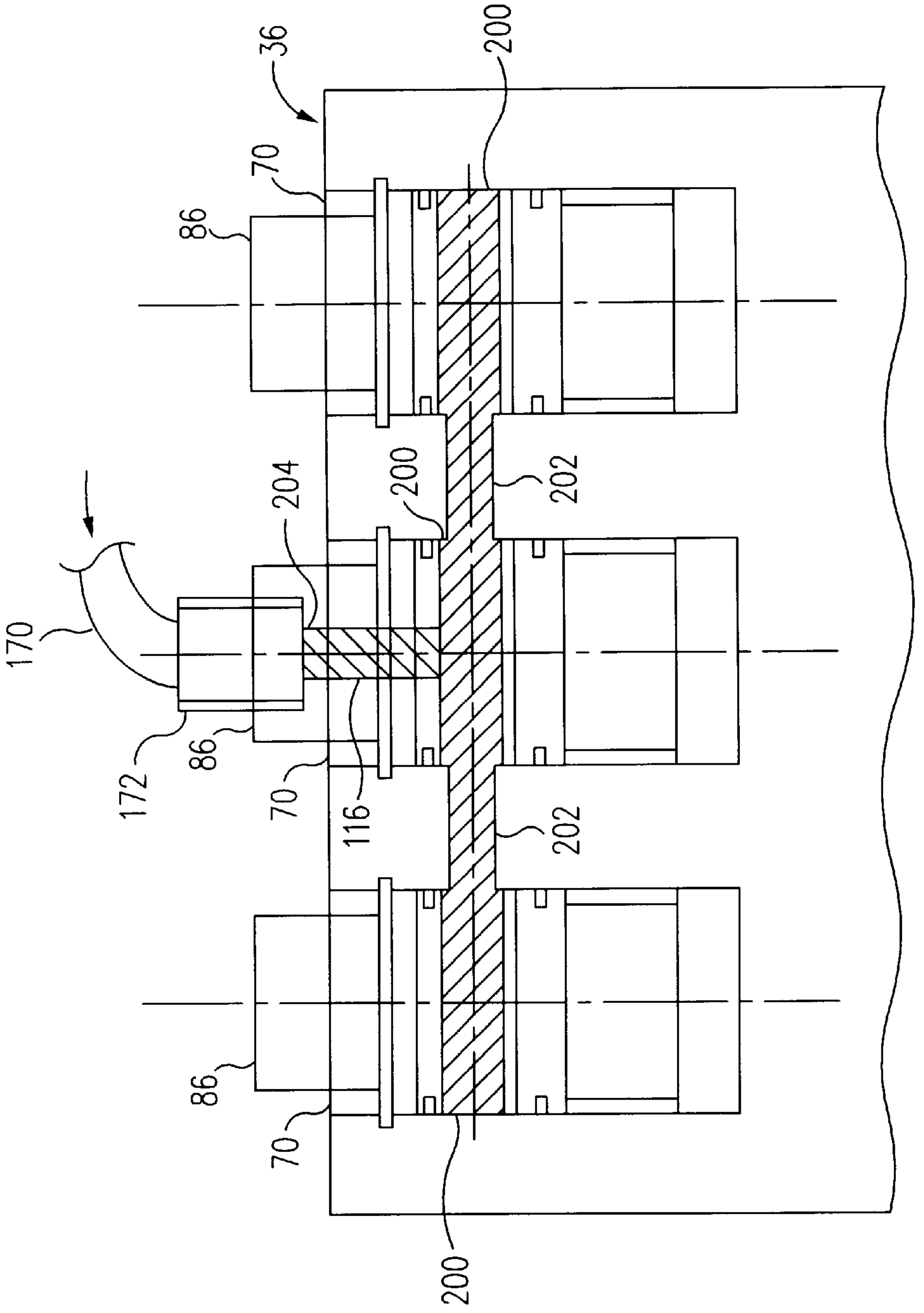
FIG. 7 is a simplified illustrations of another embodiment of the present invention.

As mentioned above, pressure from a hydraulic pressure source moves pusher assembly through hole 70 to apply a force to the swaging ring. FIGS. 6A and 6B show a simplified illustration of one system for supplying the hydraulic pressure to pusher assembly 76. When pusher assembly 76 and retainer assembly 86 are within hole 70, as shown in FIG. 6A, a gap is between the two assemblies. The gap serves as a reservoir 200 for fluid, which may be directed into reservoir 200 via duct 202. As shown in the cross-sectional view of FIG. 6B, the fluid may enter the housing section at port 204, which is configured to receive a quick disconnect union or the like connected to a supply line (FIG. 7). The system is designed to provide between about 5,000 psi and 20,000 psi, preferably 10,000 psi of hydraulic pressure to each pusher assembly 76. As also shown in FIG. 6B, reservoirs 200 within holes 70 may be in fluid communication with each other, and with port 204, through a series of ducts 202. Ducts 202 serve as conduits from one hole 70 to the next, such that the fluid entering at port 204 may reach each hole. In this configuration, as fluid is pumped through the supply line, into ducts 202, and into reservoir 200, retainer assembly 86 resists the reaction forces from the pressure. Once the fluid is pumped into each duct 202 and reservoir 200, the hydraulic pressure is applied equally to each pusher assembly 76, which causes each pusher assembly 76 to move simultaneously, with equal force, to push the ring over the sleeve of the fitting.

Alternatively, in the embodiment of FIG. 7, at least one retainer assembly 86 housed in a section may be configured to mate with a quick disconnect union 172, such that the single hydraulic supply line 170 supplies reservoirs 200 through inner lumen 116. In this alternative embodiment, the hydraulic pressure is transferred through inner lumen 116 to reservoir 200 and into ducts 202 until the pressure in the system equalizes. At the point at which the system is equalized, the pressures to pusher assemblies 76 are equal and uniform, which causes each pusher assembly 76 to translate axially, in unison, at a uniform pace with an equal force.

Figure 8A:
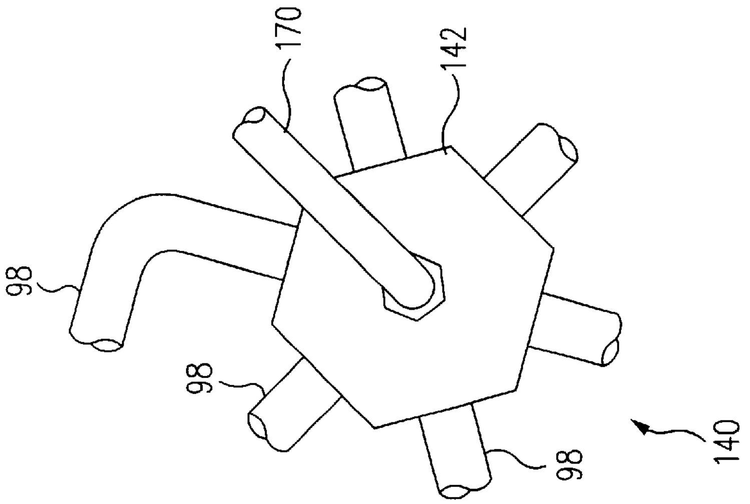
FIGS. 8 and 8A are simplified illustrations of another embodiment of the present invention.
Figure 8:
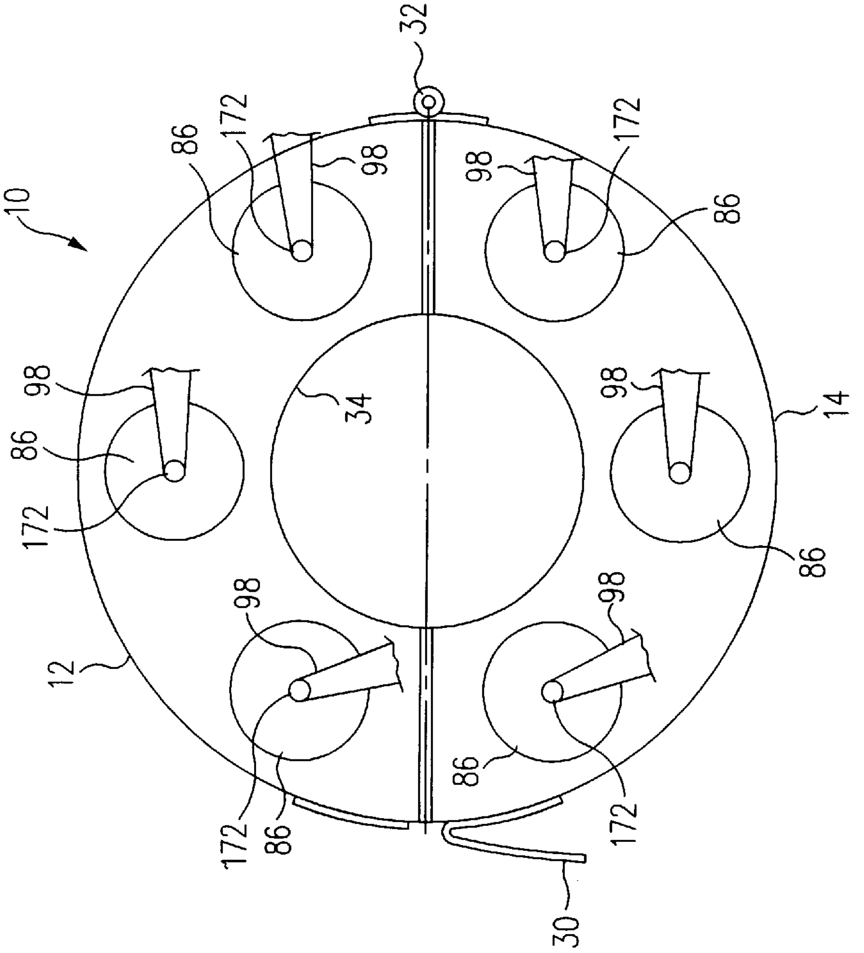

In yet another alternative embodiment, shown in FIGS. 8 and 8A, each retainer assembly 86 may be configured to mate with a quick disconnect union 172. In this alternative embodiment, the hydraulic pressure is transferred through supply line 170 into an appropriately divided union, in this example a hexagon union, into hoses 98. Each retainer assembly 86 receives the hydraulic fluid through hoses 98 to inner lumen 116 to reservoir 200. When the pressure to pusher assemblies 76 is equal and uniform, each pusher assembly 76 is made to translate axially, in unison, at a uniform pace with equal force.

Figure 9:
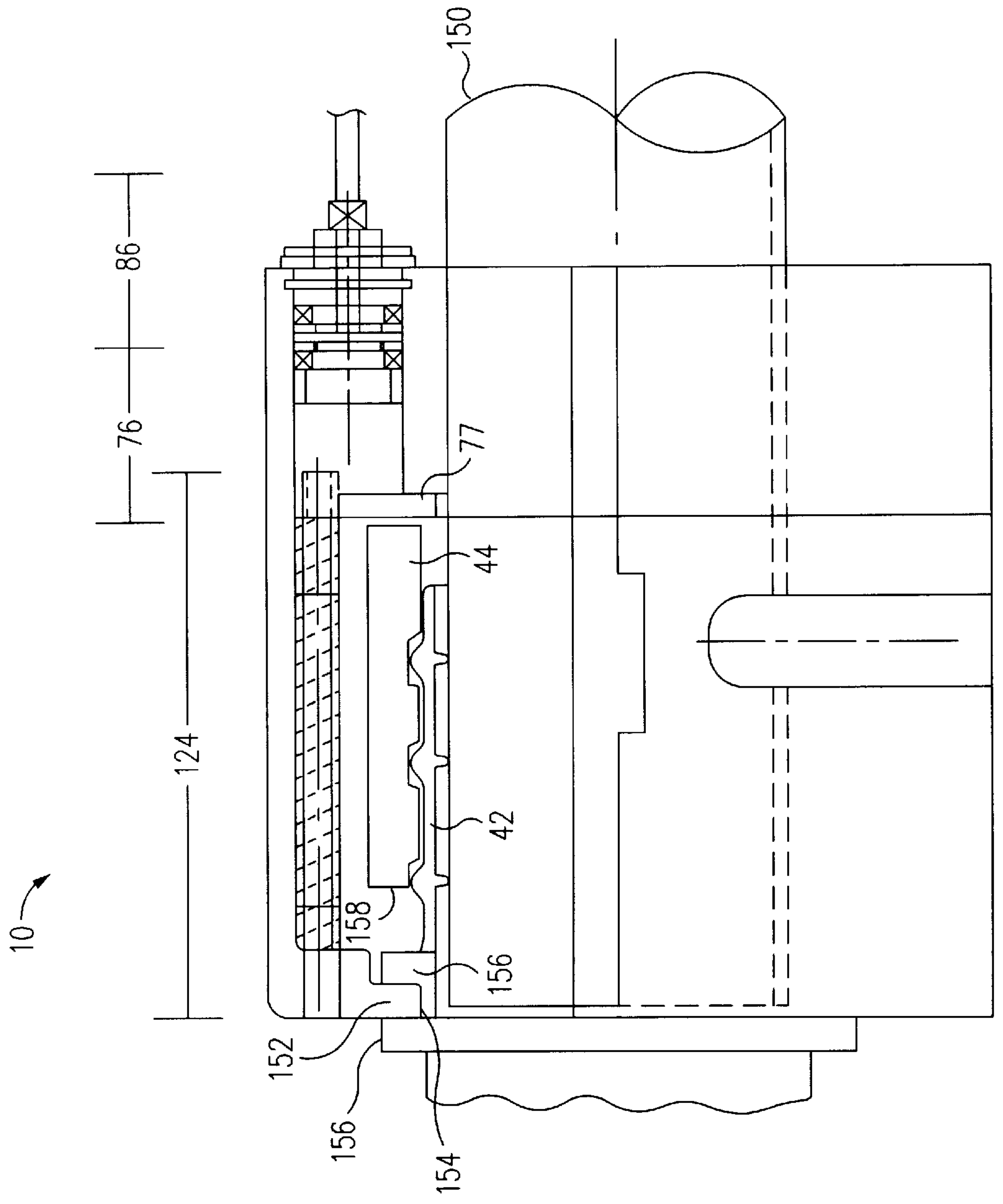
FIG. 9 is a simplified cross-sectional view of an embodiment of the present invention, including the fitting of FIG. 2.

FIG. 9 shows a partial cross-sectional view of swaging tool 10 with biasing assembly 124, pusher assembly 76, and retainer assembly 86 housing section 12. Fitting 40, with sleeve 42 and ring 44, is also shown in a pre-swaged configuration around a pipe-section 150. At second end 38 of tool 10 is a flanged lip 152, flanged lip 152 engages a portion of sleeve 42, such that the sleeve may be held fixed relative to ring 44, during the swaging operation. Lip 152 is positioned in a tool groove 154 provided on sleeve 42. Tool groove 154 is between two stop flanges 156. In a preferred operational embodiment, ring 44 advances until forward end 158 of ring 44 contacts stop flange 156. This ends the swaging operation.

Most of the components of swaging tool 10 may be made from bar stock. For example, housing sections 12 and 14 may be from PH13-8 Mo. Stainless Steel and formed using conventional machining and/or milling practices. Preferably, some components, such as pushers 77 and retainers 114, may be made from a less dense material, such as titanium or else a composite. Most bearings may be made from a composite material, such as ORKOT. All the bearings, snap rings, washers, oil seals, and springs are conventional components the function and availability of which are well known.

Swaging tool 10 is generally a portable tool, such that tool 10 may be transported to a site where swaging is required. Accordingly, tool 10 may include handles and/or lifting lugs. In one embodiment, tool 10 may be configured to be bench mounted.

Although particular embodiments of the invention have been illustrated and described, modifications and changes may become apparent to those of skill in the art. It is intended in the appended claims to cover all such evolution, changes and modifications as come within the scope of the invention.

What is claimed is:

1. A swaging tool for swaging a fitting having a sleeve and a swaging ring onto a pipe, said swaging tool comprising:

a housing having an inner surface, a first end, a second end, and a bore extending therebetween, said bore being capable of receiving a portion of a pipe; and a plurality of axially movable pusher assemblies disposed uniformly and circumferentially spaced around said bore, said pusher assemblies being brought into contact with said fitting to provide an evenly distributed axial force to said swaging ring to move said swaging ring relative to said sleeve to swage said ring and sleeve onto said pipe.

2. A swaging tool as in claim 1, wherein said housing comprises a first housing section and a second housing section, said housing sections being symmetrical housing sections, wherein each housing section includes an equal number of said pusher assemblies.

3. A swaging tool as in claim 2, wherein said housing comprises a fastening mechanism to removably couple said two sections of said housing.

4. A swaging tool as in claim 1, wherein said plurality of pusher assemblies comprises an even number of pusher assemblies taken from the group consisting of 2, 4, 6, 8, 10, and 12 pusher assemblies.

5. A swaging tool for swaging a fitting having a sleeve and a swaging ring onto a pipe, said swaging tool comprising:

a housing having an inner surface, a first end, a second end, and a bore extending therebetween, said bore being capable of receiving a portion of a pipe;

a plurality of pusher assemblies disposed uniformly and circumferentially around said bore, said pusher assemblies being brought into contact with said fitting to provide an evenly distributed axial force to said ring thereby swaging said ring and sleeve onto said pipe; and a plurality of cylindrical holes formed axially along said housing and circumferentially around said bore, each of said pusher assemblies being disposed within each of said cylindrical holes.

6. A swaging tool for swaging a fitting having a sleeve and a swaging ring onto a pipe, said swaging tool comprising:

a housing having an inner surface, a first end, a second end, and a bore extending therebetween, said bore being capable of receiving a portion of a pipe; and a plurality of pusher assemblies disposed uniformly and circumferentially around said bore, said pusher assemblies being brought into contact with said fitting to provide an evenly distributed axial force to said ring thereby swaging said ring and sleeve onto said pipe;

each pusher assembly including a substantially circular pusher face, a semi-circular ring being coupled to each pusher face, said semi-circular ring being configured to engage said ring.

7. A swaging tool as in claim 1, wherein said pusher assembly comprises an elongated flared surface being configured to engage said swaging ring.

8. A swaging tool for swaging a fitting having a sleeve and a swaging ring onto a pipe, said swaging tool comprising:

a housing having an inner surface, a first end, a second end, and a bore extending therebetween, said bore being capable of receiving a portion of a pipe;

a plurality of pusher assemblies disposed uniformly and circumferentially around said bore, said pusher assemblies being brought into contact with said fitting to provide an evenly distributed axial force to said ring thereby swaging said ring and sleeve onto said pipe; and a plurality of retainer assemblies, wherein spaces are formed between each pusher assembly and each retainer assembly, said spaces defining reservoirs.

9. A swaging tool as in claim 8, wherein a hydraulic fluid is supplied to each reservoir under pressure to cause said pusher assembly to move.

10. A swaging tool as in claim 8, further comprising a network of ducts, wherein each of said reservoirs is in fluid communication through said network of ducts.

11. A swaging tool as in claim 1, further comprising a biasing device disposed in said housing to bias said pusher assembly.

12. A system for providing a swaging force, said system comprising:

a fitting having a sleeve and a swaging ring, said sleeve including a deformable stepped portion; and a plurality of pusher assemblies disposed circumferentially in a housing to provide an evenly distributed force to axially move said swaging ring over said sleeve and deform said stepped portion, said housing including a bore for receiving a pipe section, said plurality of pusher assemblies being symmetrically positioned on the circumference of the bore.

13. The system of claim 12, wherein said housing comprises two symmetrical housing sections, wherein each housing section includes an equal number of said pusher assemblies.

14. The system of claim 12, wherein each pusher assembly comprises a substantially circular pusher face, wherein a semi-circular ring is coupled to each pusher face, said semi-circular ring being configured to engage said swaging ring.

15. The system of claim 12, wherein said pusher assembly comprises an elongated flared surface being configured to engage said swaging ring.

16. The system of claim 12, further comprising a plurality of retainer assemblies, wherein spaces are formed between each pusher assembly and each retainer assembly, said spaces defining reservoirs.

17. The system of claim 16, wherein a hydraulic fluid is supplied to each reservoir under pressure to cause said pusher assembly to move.

18. The system of claim 16, further comprising a network of ducts, wherein each of said reservoirs is in fluid communication through said network of ducts.

19. The system of claim 12, further comprising a biasing device disposed in said housing to bias each of said pusher assemblies.

20. A swaging tool for swaging a fitting having a sleeve and a swaging ring onto a pipe, said swaging tool comprising:

a housing defining a bore and having a first housing section and a second housing section, said bore being capable of receiving a portion of a pipe; and a plurality of axially movable pusher assemblies disposed uniformly and circumferentially spaced in said housing around said bore, each housing section including an equal number of said pusher assemblies, said pusher assemblies providing an evenly distributed axial force to said fitting to move said swaging ring relative to said sleeve to swage said ring and sleeve onto said pipe.

* * * * *

UNITED STATES PATENT AND TRADEMARK OFFICE

CERTIFICATE OF CORRECTION

PATENT NO. : 6,199,254 B1
APPLICATION NO. : 09/434632
DATED : March 13, 2001
INVENTOR(S) : Srinivas B. Suresh It is certified that error appears in the above-identified patent and that said Letters Patent is hereby corrected as shown below:

On the Title Page, Item (73) Assignee:

Delete “Mechl” and insert --Mech1--

Signed and Sealed this

First Day of July, 2008

JON W. DUDAS
*Director of the United States Patent and Trademark Office*